(12) United States Patent
Lang et al.

(10) Patent No.: US 6,688,749 B2
(45) Date of Patent: Feb. 10, 2004

(54) EXTERNAL MIRROR ASSEMBLY FOR VEHICLES AND METHOD OF ASSEMBLING SAME

(75) Inventors: Heinrich Lang, Ergersheim (DE); Alfred Kolb, Marktbergel (DE); Wolfgang Seiboth, Bad Windsheim (DE); Albrecht Popp, Weihenzell (DE)

(73) Assignee: Mekra Lang GmbH & Co. KG, Ergersheim (DE)

( * ) Notice: Subject to any disclaimer, the term of this patent is extended or adjusted under 35 U.S.C. 154(b) by 0 days.

(21) Appl. No.: 10/076,185

(22) Filed: Feb. 14, 2002

(65) Prior Publication Data

US 2002/0163743 A1 Nov. 7, 2002

Related U.S. Application Data

(63) Continuation of application No. 09/045,098, filed on Mar. 20, 1998, now Pat. No. 6,390,634.

(30) Foreign Application Priority Data

Mar. 20, 1997 (DE) .......................................... 197 11 547

(51) Int. Cl.⁷ ................................................. G02B 7/82
(52) U.S. Cl. ........................ 359/871; 359/850; 359/855
(58) Field of Search ................................ 359/604, 850, 359/855, 864, 865, 866, 838, 870, 871, 872, 876, 883; 248/476, 466; 428/323

(56) References Cited

U.S. PATENT DOCUMENTS

| | | |
|---|---|---|
| 3,291,435 A | 12/1966 | Herr |
| 3,383,152 A | 5/1968 | Ward |
| 3,448,553 A | 6/1969 | Herr et al. |
| 3,508,815 A | 4/1970 | Scheitlin et al. |
| 3,659,929 A | 5/1972 | Yuzawa |
| 4,174,823 A | 11/1979 | Sutton et al. |
| 4,957,359 A | 9/1990 | Kruse et al. |
| 5,295,021 A | 3/1994 | Swanson |
| 5,493,828 A | 2/1996 | Rogowsky et al. |
| 5,576,884 A | 11/1996 | Ise et al. |
| 5,659,423 A * | 8/1997 | Schierbeek et al. .......... 359/604 |
| 5,786,948 A | 7/1998 | Gold |
| 5,942,324 A * | 8/1999 | Chu et al. .................... 428/323 |

FOREIGN PATENT DOCUMENTS

| | | |
|---|---|---|
| CA | 1095008 | 2/1981 |
| DE | 1990699 | 12/1965 |
| DE | 1293620 | 4/1969 |
| DE | 7218365 | 5/1972 |
| DE | 2322901 | 11/1974 |
| DE | 7508246 | 7/1975 |
| DE | 2537876 B2 | 3/1977 |
| DE | 2703105 A1 | 8/1977 |
| DE | 2629779 B2 | 7/1978 |
| DE | 2802503 A1 | 7/1978 |
| DE | 7827796 | 1/1979 |
| DE | 2537876 C3 | 8/1979 |
| DE | 149345 | 8/1981 |
| DE | 3040284 A1 | 4/1982 |
| DE | 8905801 | 8/1989 |
| DE | 4010083 A1 | 10/1991 |
| DE | 9108483 | 1/1992 |
| DE | 4200744 A1 | 7/1993 |
| DE | 9414268 | 12/1994 |
| DE | 19513773 | 10/1995 |
| DE | 4429604 A1 | 2/1996 |
| DE | 19530913 | 2/1997 |
| EP | 0522442 A1 | 1/1993 |

OTHER PUBLICATIONS

Verified Translation of German Ref. No. G 91 08 483.0, dated Jan. 9, 1992.

\* cited by examiner

*Primary Examiner*—Euncha Cherry
(74) *Attorney, Agent, or Firm*—McNair Law Firm, PA; Cort Flint

(57) ABSTRACT

A rear view mirror assembly for commercial vehicles comprises a tubular support structure having a first end fixable to a commercial vehicle and a second end extending from the commercial vehicle, and a support arm including a molded part and at least one core element. The molded part encapsulates the core element and a substantial portion of the tubular support structure. The molded part and the core element each have a respective density, the core element density being less than the molded part density, whereby the presence of the core element within the molded part reduces the overall weight of the support arm.

17 Claims, 2 Drawing Sheets

EXTERNAL MIRROR ASSEMBLY FOR VEHICLES AND METHOD OF ASSEMBLING SAME

RELATED APPLICATIONS

The present application is a Continuation Application of U.S. Application Ser. No. 09/045,098 filed Mar. 20, 1998 now U.S. Pat. No. 6,390,634, incorporated by reference herein, claiming priority under 35 U.S.C. §119 to patent application DE 19711547.0, filed Mar. 20, 1997 in the German Patent Office.

FIELD OF THE INVENTION

The invention concerns a rear view mirror assembly for commercial vehicles, in particular, for buses.

BACKGROUND OF THE INVENTION

For the last named installation purpose, many very conspicuous mirror designs have been employed, in which cases, a mirror arrangement placed substantially forward on the upper end of the A-column of the bus chassis has been used. In these outward extending designs, the so-called "crescent mirror", the main mirror and further additional mirrors are integrated for (a) the monitoring of the passenger entrance area and (b) for visual supervision of such areas not otherwise within the driver's view.

A representation of such "crescent mirrors" is disclosed in DE 44 29 604 A1 (corresponding to U.S. patent application Ser. No. 08/804,205 now U.S. Pat. No. 6,382,804). In this case, the outwardly extending housing is designed as a self supporting, foamed component with a foam core and an enveloping, stiffening layer. For the installation of this foamed component onto the chassis, anchor plates are embedded on the end thereof, which is in proximity to said chassis. The anchor plates, in turn, are threadably connectable to a corresponding anchor block on the bus body to form a pivoting securement.

A problematic aspect of this known mirror is the stability of the foam structure as such, since such structures, because of the considerably large dimensioning of the mirror arrangement extension, are subject to the action of high forces arising from driving dynamics. This is true also for the stability of the connection between the foam-embedded anchor plate and the foam material which envelopes it.

Moreover, the foaming of self supporting, voluminous molded components, as these are used in the DE 44 29 604 A1 in the illustrated bus mirrors, is not without technical problems in molding.

SUMMARY OF THE INVENTION

From the standpoint of safety and design, however, the above described "crescent mirrors" have been favored for buses.

Evolving from this, the present invention takes upon itself the purpose of creating a rear view mirror arrangement for commercial vehicles, in particular suitable for buses, the constructive concept of which, in regard to stability, installation ease, and formative characteristics, is especially suited to these "crescent mirrors".

In accordance with this, the rear view mirror is provided with:

a support arm installable on the body, having
a carrying tubular structure as core element,
a main mirror fastened to the free end of the tubular structure,
a housing having a mirror plate recessed therein, and
a molded part enveloping and covering the tubular structure between its end proximal to the bus body and the principal mirror.

In an advantageous manner, the given tubular structure brings the required stability to the mirror arrangement. By means of the design of the main mirror, as a stand-alone mirror with housing and mirror pane, a conventional mirror can be used, for instance, such as is employed for trucks. The molded portion enveloping the tubular structure serves as a shell shaped in selected design, which simultaneously achieves aerodynamic improvements and an additional stability to the tubular structure.

The latter is especially true when, in accord with a preferred development of the object of the invention, the molded component as a part molded around the tubular structure is comprised of, for instance, a two-component hard foam. Not only does a design of this kind for the molded part bring with it simplifications in manufacturing and in the technical requirements of installation, but the tubular structure itself is greatly reinforced by said molded component and additionally stabilized at the same time.

In accord with preferred formulations of the subject of the invention, the molded component exhibits at least one placement recess for the acceptance of one or more auxiliary mirrors. These placement recesses are very simply made in the case of a formed, foam component.

The auxiliary mirrors, can, when the case requires, be installed with an adjustment means on the molded part, wherein the mechanism—or the auxiliary mirror—can be threadedly engaged directly with the molded component. In the case of a molded foam component, this is especially simple. The auxiliary mirrors further can be adjustable by electric motors, replaceable and/or heatable. The given arrangement is governed by the wish of the customer.

To be sure, if the molded component in the case of production from foamed material is comparatively light in weight, the overall weight of the mirror arrangement can still be reduced by means of inset cores in the said foamed material of the molded part. Also in this case a stabilization for the tubular structure can in turn be achieved if—as is allowed for in a further advantageous improvement—the inset cores lie closely about the tube members of the tubular structure.

Further advantageous embodiments of the object of the invention are found in the design of the tubular construction, the attachment of the same onto to vehicle body and the installation of the self-contained principal mirror. More detail can be given in this respect by reference to the illustrated description.

For the remainder, additional features, details and advantages of the invention may be inferred from the description following hereinafter, by the use of the attached drawing, in which example embodiments of the object of the invention are presented in greater detail.

DESCRIPTION OF THE PREFERRED EMBODIMENTS

There is shown in:

FIG. 1 a partially sectioned profile view of a rear view mirror arrangement for a bus according to the present invention;

FIG. 2 a section along the line II—II of FIG. 1; and

FIG. 3 a schematic profile view of a tubular structure of the rear view mirror arrangement according to the present invention with indicated encapsulating foamed molded part.

BRIEF DESCRIPTION OF THE DRAWINGS

Reference will now be made to the presently preferred embodiments of the present invention, one or more examples of which are illustrated in the drawings. Each example is provided by way of explanation of the invention, and not meant as a limitation of the invention. For example, features illustrated or described as part of one embodiment can be used on another embodiment to yield yet another embodiment. It is intended that the present invention includes such modifications and variations.

Figure 1:
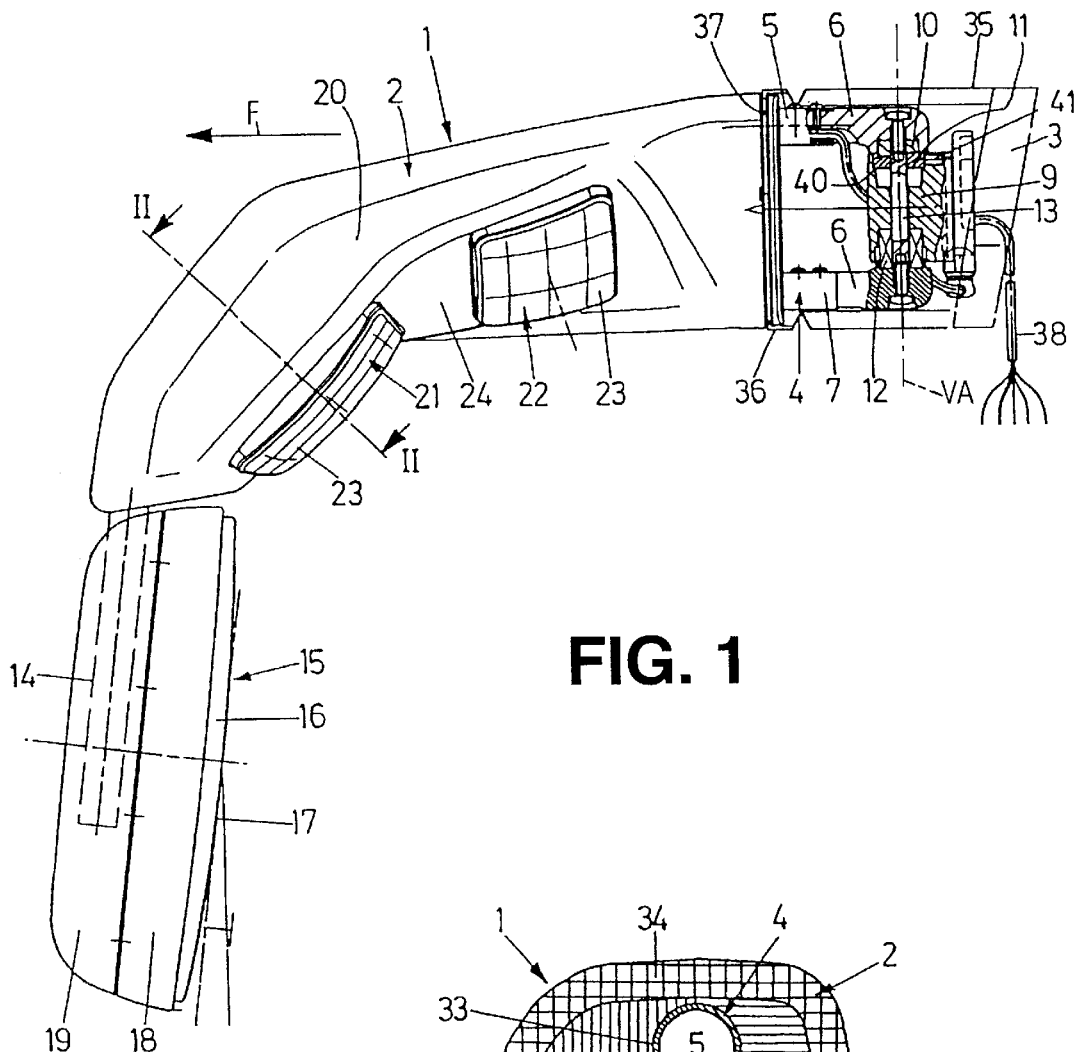
As shown in FIG. 1 and FIG. 2, the depicted rear view mirror arrangement is designated as the so-called "crescent mirror" 1. The support arm thereof, designated in general as 2 is seated on roughly outlined A-column 3 of a bus and extends forward in the travel direction "F", within the vision accessible zone of the windshield. In its fundamental form, the crescent mirror describes a 90° arc, the radius of which extends more or less to one meter.
Figure 2:
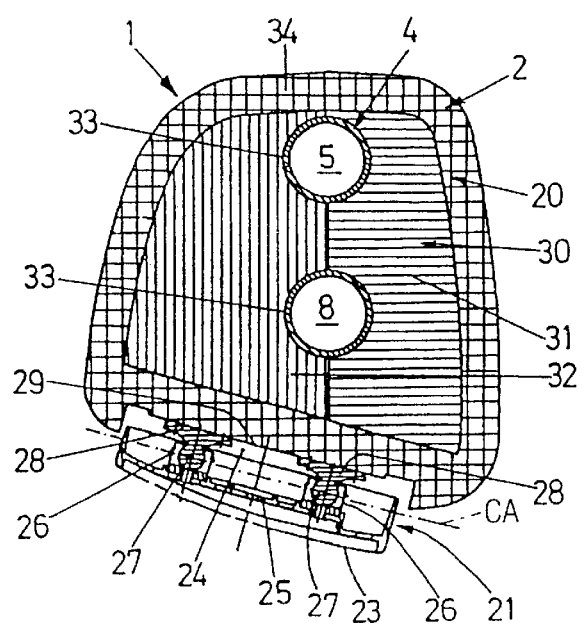
Figure 3:
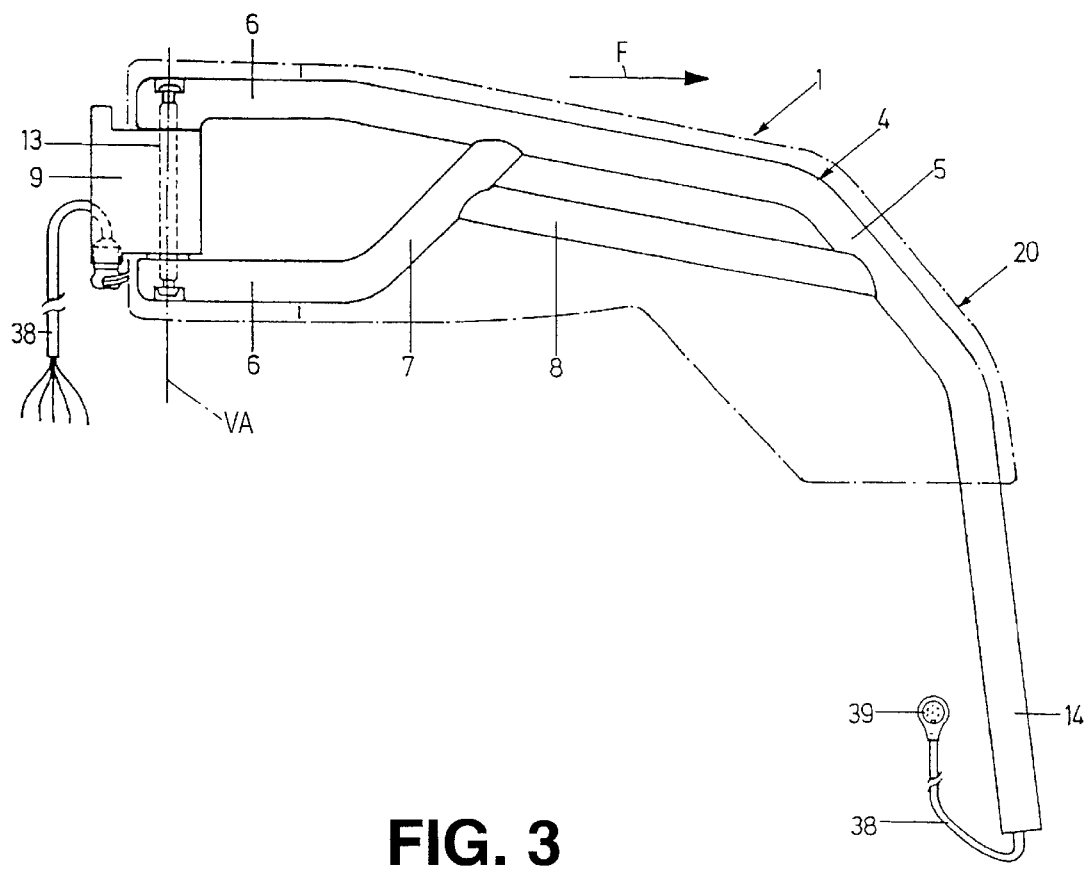

The basic core element of the mirror assembly 1 is a tube structure 4, which, in FIGS. 1 and 2, particularly in section, is recognizable near its ends. As FIG. 3 shows, the tubular structure 4 consists of a main strut 5 following the contour of the crescent mirror, onto which at the end in proximity to the vehicle body, is welded a forked, branched additional strut 7. The latter strut is additionally coupled to a supporting strut 8, leading to the main strut 5. Thus the tubular structure 4 is formed into a very stable, self supporting design.

The tubular structure 4 is pivotable about a vertical axis VA linked in an anchor block 9 which is affixed to the A-column 3 of the bus. In this arrangement, the anchor block 9 is placed between the two ends of the fork of the main and additional struts 5, 7. These three components [i.e. block 9 and the two strut ends], by the interposition of positioning disks 10, 11 and a plate spring packet 12, are bound to one another in a known manner by a threaded bolt 13 between the ends 6 of struts 5 and 7 and the anchor block 9. The upper positioning disk 10 is nonrotatably coupled to the main strut 5, while the lower positioning disk 11 is seated pivotably on a ring shoulder 40 in the anchor block 9. The positioning disk 11 is fixed in a specified turning position by a laterally extending threaded rod 41 which is engaged in a tapped boring of the anchor block 9. This defines the basic angular positioning of the rear view mirror arrangement 1 in relation to the anchor block 9, and thereby its angular positioning to the vehicle body A-column 3. By means of the loosening of the threaded rod 41, the rotating of the rear view mirror assembly 1 by the two positioning disks 10, 11, and subsequently the securing of the lower positioning disk 11 with the help of the threaded rod 41, the basic angular positioning fix is adjustable in a stepless manner. The "washing position" of the rear view mirror arrangement 1 is also defined by the profiling of the two positioning disks 10, 11.

By means of the stepless adjustability by basic angular positioning of the mirror the latter can be adapted to different types of buses without special constructive measures.

As is further evident from FIGS. 1 and 2, on the free end 14 of the main strut of the tubular structure 4, a principal mirror 15 is affixed, which, for instance, can be comprised of a conventional truck mirror. As an example taken out of many possibilities, a mirror is here selected as described in DE 43 39 297 A1. This mirror 15 possesses internally a carrying plate (not shown), which is not described here in any more detailed terms, which carrying plate, by means of a pair of clamping shells (not shown) is screwed onto the free end 14 of the main strut 5. A pivotable component (not shown) is secured to this carrying plate by means of a universal joint (not shown), on which is affixed a replaceable mirror pane securement 16 with a mirror pane 17 adhesively affixed thereto. The releasable connection between the mirror pane securement 16 and the pivoting component represents, for instance, the so-called clamping closure connection, as it is depicted in European Patent EP 0 609 508 B1. The housing of the principal mirror 15 is comprised of a base housing component 18 and a cover piece 19 set thereupon. This cover piece 19 also encapsulates the free end 14 of the main strut 5 and its clamping shell connection with the central carrying plate of the principal mirror 15.

As is illustrated plainly by FIGS. 1 and 2, the tubular structure 4 between its proximal end 6 and the free end 14 of the main strut 5 is covered with an encapsulating, molded foam part 20 comprised of a two-component, hard foam and—because of the intimate connection between the struts 5, 7 and 8 and the molded part 20—is additionally stabilized in its carrying function. The molded part 20 can, on the one hand, under design and aerodynamic aspects, be freely shaped.

Additionally, the molded part 20 serves for the installation of the auxiliary mirrors 21, 22 on the inner side of the essentially bow shaped run of the molded part 20. The auxiliary mirrors 21, 22 exhibit generally strongly convex mirror panes 23 and serve for the safety monitoring of the dead angle zones, not otherwise visible to the driver. In this way, by means of the lower auxiliary mirror 21, the passenger side location between the front end of the bus and the front axle can now be inspected, while the upper auxiliary mirror 22 covers the area directly in front of the bus.

As is depicted in FIG. 1 and FIG. 2, the two auxiliary mirrors 21, 22 are seated in a shallow recess 24 of the molded part 20. The mirrors 21, 22 once again possess mirror carrying plates 25 upon which the respective mirror pane 23 is adhesively affixed. The mirror carrying plates 25 are, respectively, provided with cup bearings 26 which seat upon respective ball ended heads 27 in the area of the recess 24. The ball heads 27 serve, in conjunction with the cup bearings 26, as a manually activated adjustment mechanism. The feet 28 of the ball heads 27 are directly anchored in the base 29 of the molded part recess 24 by screws which are not shown in detail. The auxiliary mirror 21 shown in FIG. 2 is pivotable about the connection axis CA between the ball heads 27. Since the mirror carrying plate 25 with its cup bearings 26 can be withdrawn from the ball heads 27, the auxiliary mirrors 21, 22 are easily exchangeable.

Also, not shown of itself in FIG. 1 or 2, an electric motor can be provided instead of the manual adjustment mechanism in accord with FIG. 2. Thereby, a customarily compact adjustment module can be installed in the recess 24. Control cabling can also be run for this motorized adjustment drive, as for the respective cable for a heating of the auxiliary mirrors 21, 22 through the tubular structure 4 and the molded part 20.

As may be further inferred from FIG. 2, the molded part 20 is provided with a two-part insert core 30, the two halves of 31, 32 which clampingly surround the main and support struts 5 and 8 respectively, by means of corresponding, half cylindrical recesses 33. The inserted core 30 is comprised of a lighter material than the remaining shell 34 of the molded part 20, which, for example, is made from a polyurethane hard foam. This material forms a smooth surface which can be lacquered.

Finally, the chassis proximal end 6 of the main and additional struts 5 and 7 respectively, is covered, along with the anchor block 9, by a surrounding bellows enclosure 35.

An edge 36 of the bellows enclosure 35 facing the molded part 20 is snapped into a groove 37 which circumferentially runs around the molded part 20 at the chassis proximal end thereof.

Also, in FIGS. 1 and 3, a multi-conductor cable 38 is presented, by means of which the electro-motor adjustment drive of the principal mirror 15 can be controlled and/or mirror heating is supplied with energy. The cable 38 is led into the main strut 5 through the anchor block 9. On the mirror proximal end of the cable 38 is provided a plug 39, which can be connected with a corresponding socket at the principal mirror 15.

It will be apparent to those skilled in the art that various modifications and variations can be made in the present invention without departing from the scope and spirit of the invention. It is intended that the present invention include such modifications and variations as come within the scope of the appended claims and their equivalents.

That which is claimed is:

1. A rear view mirror assembly for a vehicle made by the process comprising the steps of:

providing a support frame having a first end, a second end and a surface, the first end configured for attachment to the vehicle, the second end disposed apart from the first end and configured to attachably receive a mirror;

molding a core member with a complementary surface, the core member having a first density;

placing the core member about at least a portion of the support frame such that the complementary surface mates about the surface, wherein the placing step occurs after the molding steps; and molding a molded part about the core member and the at least a portion of the support frame such that the molded part encapsulates the core member and the at least a portion of the support frame.

2. The rear view mirror assembly as in claim 1, wherein the core member is a first polyurethane foam.

3. The rear view mirror assembly as in claim 2, wherein the molded part is a second polyurethane foam applied on the first polyurethane foam, the second polyurethane foam having a density greater than the first polyurethane foam.

4. The rear view mirror assembly as in claim 1, wherein the complementary surface slidably receives the surface.

5. The rear view mirror assembly as in claim 1, further comprising the step of lacquering the molded part.

6. The rear view mirror assembly as in claim 1, further comprising the step of attaching a mirror to the second end.

7. The rear view mirror assembly as in claim 1, further comprising the step of attaching the rear view mirror assembly to the vehicle.

8. A rear view mirror assembly for a vehicle made by the process comprising the steps of:

providing a support frame configured for attachment to the vehicle;

molding a core member;

forming a recess on the core member;

placing the core member about a portion of the support frame such that the support frame is matingly received in the recess; and encasing the core member and the portion of the support frame in a shell, wherein the shell is formed by applying a polyurethane solution about the core member and the support frame.

9. The rear view mirror assembly as in claim 8, wherein the shell is formed by blow molding.

10. The rearview mirror assembly as in claim 8, wherein the polyurethane solution is solidified to form the shell.

11. The rear view mirror assembly as in claim 8, wherein the shell has a density greater than the core member.

12. The rear view mirror assembly as in claim 8, wherein the shell is formed by injection molding.

13. The rear view mirror assembly as in claim 12, further comprising the steps of forcing a foam polymer into a mold, hardening the polymer to the shape of the mold to form the shell, opening the mold and removing the shell, the shell having a density greater than the core member.

14. The rear view mirror assembly as in claim 8, wherein the shell is formed by extrusion molding.

15. The rear view mirror assembly as in claim 14, further comprising the steps of providing a polyurethane material, shaping the polyurethane material in a shape of the shell, and solidifying the shaped shell with a density greater than a density of the core member.

16. A rear view mirror assembly for a vehicle made by the process comprising the steps of:

providing a support frame configured for attachment to the vehicle;

molding a core member;

forming a complementary surface on the molded core member;

placing the molded core member about a portion of the support frame such that the complementary surface mates about the surface;

molding a shell about the core member and the portion of the support frame; and lacquering the shell.

17. A rearview mirror assembly for a vehicle made by the process comprising the steps of:

providing a support frame configured for attachment to the vehicle;

molding a core member;

forming a recess on the core member;

placing the core member about a portion of the support frame such that the support frame is matingly received in the recess;

applying a polyurethane solution about the core member and portion of the support frame; and solidifying the polyurethane solution to form a shell about the core member and the portion of the support frame.

* * * * *